United States Patent
Lee

(10) Patent No.: US 6,748,367 B1
(45) Date of Patent: Jun. 8, 2004

(54) METHOD AND SYSTEM FOR EFFECTING FINANCIAL TRANSACTIONS OVER A PUBLIC NETWORK WITHOUT SUBMISSION OF SENSITIVE INFORMATION

(76) Inventor: Joonho John Lee, 26 Rivendell Dr., Shelton, CT (US) 06484

( * ) Notice: Subject to any disclaimer, the term of this patent is extended or adjusted under 35 U.S.C. 154(b) by 638 days.

(21) Appl. No.: 09/667,832

(22) Filed: Sep. 21, 2000

Related U.S. Application Data

(60) Provisional application No. 60/155,858, filed on Sep. 24, 1999.

(51) Int. Cl.$^7$ ............................ G06F 17/60; H04K 1/00; H04L 9/00

(52) U.S. Cl. ............................. 705/66; 705/64; 705/70; 705/69; 705/74; 705/21

(58) Field of Search ............................. 705/66, 64, 70, 705/69, 21, 67; 380/241, 231; 713/170, 182, 200, 201, 202

(56) References Cited

U.S. PATENT DOCUMENTS

| | | | | |
|---|---|---|---|---|
| 5,913,202 A | * | 6/1999 | Motoyama | 705/35 |
| 6,058,375 A | * | 5/2000 | Park | 705/30 |

(List continued on next page.)

FOREIGN PATENT DOCUMENTS

| | | | | |
|---|---|---|---|---|
| GB | 2060233 A | * | 4/1981 | H04L/9/00 |
| WO | WO 02/33363 A2 | * | 4/2002 | G01F/19/00 |

OTHER PUBLICATIONS

Anonymous, Cash is the untimate criminal, in debit advocates's eyes, Jun. 1994, POS News, V11, n 1, pp 6–9.*

Jim Middlemiss, Bank of America offering remintance data via secure web site, Feb. 2001, Bank Systems & Technology, pp 18–20.*

(List continued on next page.)

*Primary Examiner*—James P. Trammell
*Assistant Examiner*—Firmin Backer
(74) *Attorney, Agent, or Firm*—Raymond A. Nuzzo

(57) ABSTRACT

A method and system for effecting a financial transaction over a public network without the submission of sensitive information. The system comprises a common controller in data communication with at least one public network. The common controller includes a processor for generating digital tokens wherein each digital token represents a particular monetary value and contains a particular digital signature and alterable digital token status data indicating ownership of the digital token. The system includes a plurality of user data communication interfaces in data communication with the public network. The processor of the common controller includes data bases for storing user account information such as user identification and PIN, and account values and for authenticating the user identification and PIN to determine whether access to the common controller is permitted. The common controller generates an application level secure communication channel through which all data communication is to be effected and transmits data representing a template of an automated teller machine to the user data communication interface of a first user whose identification PIN was previously authenticated. Financial transactions between the first user and a second user are initiated by using the automated teller machine to transmit a request to the common controller to effect a transfer of a monetary sum to a destination account. The common controller generates a temporary account identified by an account number for temporarily storing the transferred monetary sum and also generates multiple digital tokens having a value equal to the monetary sum in the temporary account and data defining a unique digital signature and a digital token status. The temporary account number is encrypted.

16 Claims, 13 Drawing Sheets

U.S. PATENT DOCUMENTS

| | | | | |
|---|---|---|---|---|
| 2001/0037290 A1 | * | 11/2001 | Lai | 705/39 |
| 2002/0004780 A1 | * | 1/2002 | Mizuta | 705/39 |
| 2002/0016754 A1 | * | 2/2002 | Khan et al. | 705/35 |
| 2002/0087467 A1 | * | 7/2002 | Mascavage et al. | 705/39 |
| 2002/0111907 A1 | * | 8/2002 | Ling | 705/41 |

OTHER PUBLICATIONS

Maria Bruno, Amex plas hide and seek online amex hides consumers's card number from crooks while hiding consumers's identities from marketers,, Nov. 2000, Bank Technology News, v10, n11, pp134+.*

Dreanos stan, Round Knock out: electronic Banks vs Briks & Motar Banks, Jul. 2001, UPSIDE, v13n7, pp 54–59.*

* cited by examiner

METHOD AND SYSTEM FOR EFFECTING FINANCIAL TRANSACTIONS OVER A PUBLIC NETWORK WITHOUT SUBMISSION OF SENSITIVE INFORMATION

This application claims the benefit of commonly owned and U.S. Provisional Application Serial No. 60/155,858, filed Sep. 24, 1999.

BACKGROUND OF THE INVENTION

1. Field of the Invention

The present invention generally relates to a method and system for effecting transactions over any public network such as the Internet, wireless network, or any other medium of non-secure communication without submission of private information, credit card and other personal information.

2. Problem to be Solved

E-commerce catalog shopping represents an increasing part of the economy. The growth in its popularity can in part be explained because consumers have learned that goods purchased from a catalog are often much less expensive than if purchased through a normal retail store. In addition, because a customer can shop without leaving the comfort of home or office, placing an order for merchandise from a catalog makes much more efficient use of the customer's time.

Shopping for goods and services using a personal computer to place an order on a network is a natural extension to the more traditional catalog shopping, since the customer enjoys these same benefits. The CompuServe network and other private networks have long offered members the opportunity to browse through on-line "Electronic Shopping Malls" and place orders for goods shown and described therein. New opportunities for shopping via personal computer arise daily as more people gain access to the Internet network, with its inter-connectivity and easy access through the World Wide Web or E-mail. Such: transactions conducted over the Internet are also referred to as "E-commerce transactions".

A credit card facilitates making purchases via telephone or over the network. However, users are justifiably concerned about placing orders for merchandise on networks such as the Internet, for example via E-mail, because of the lack of secure communications. Although there are many implementations of security measures on the Internet, unauthorized third parties have still penetrated these security measures and gained access to credit card data, social security numbers or other personal information transmitted over the network. Once a dishonest person has the credit card number, thousands of dollars can be improperly charged to the customer's credit card account.

One solution to this problem is for the customer to enter, for delivery over the network, an order that does not include the customer's credit card number. To complete the order, the customer must then call the merchant on an 800 telephone number, for example, to provide the credit card number. However, this method does not enable the credit card data to be readily associated with and entered into the order previously placed by the customer. Errors in the order can easily arise. For example, the customer's credit card number can be assigned to the wrong order. Furthermore, telephone transactions are also vulnerable to the same security and user privacy issues as described above for Internet transactions. In addition, there is usually a considerable delay to further inconvenience the customer while a clerk asks the customer other questions that will help to ensure the correct match between an order that was previously transmitted and the customer's credit card number given over the phone.

A similar approach for placing an order in current use is initiated when a customer sends an order,-without credit card information, to a merchant over a non-secure network. After receiving the order, the merchant's clerk or an automated system sends an E-mail message to the customer containing an order number that uniquely identifies the order. Upon receiving the E-mail message, the customer dials a telephone number that connects to the merchant's facilities. In response to prompting from an automated attendant, the customer enters the unique order number and correct credit card number for billing the order on a touch-tone telephone (assuming that the customer has placed the call on this type of phone). The order number is used to match the correct order with the customer's credit card number. However, this method requires that the customer retain the unique order number assigned by the merchant for entry during the subsequent phone call.

Another approach to solving this problem is to encrypt the credit card information included in an order placed on a public network. Using the encrypted credit card data, an order can be completed in a single transaction. However, virtually all of the encryption schemes thus far developed for protecting such sensitive data have drawbacks. For example, most encryption schemes require the use of an encryption key that is known only to the party encrypting information and to the intended recipient of the information who will decrypt it. The secure distribution and safeguard of such encryption keys adds too much complexity to network shopping transactions and will likely not be readily accepted by customers. While it is possible to embed an encryption key in an application designed to take an order and transmit it over the network, the embedded encryption key can be discovered by others who may then misuse it. Even public key encryption systems require use of a "private" key that should not be disclosed to others. In addition, and perhaps more importantly, the software required for any encryption system must be distributed to prospective customers before the system can be used to transfer credit card data when a customer places an order. The widespread dissemination of such software will likely not occur for some time. Even if the consumer's financial information is securely transferred to the vendor over the Internet, the consumer has submitted a substantial amount of personal information to a stranger. This personal information is often resold to other firms that send unsolicited e-mail, phone calls and junk mail. Internet commerce, as a business environment, will not grow as expected if consumers perceive unknown vendors as untrustworthy.

A new method for making payment over a public network is needed that enables a customer to place an order or make a simple fund transfer without submitting financial data, credit card numbers and other personal information. The financial data transaction should be automated for optimum efficiency and to minimize the time required for the customer to complete the transaction. The present invention represents a workable solution to this problem that is relatively efficient, secure and foolproof.

SUMMARY OF THE INVENTION

The present invention is directed, in a first aspect, a method for effecting a financial transaction over a public network without the submission of sensitive information, comprising the steps of:

a) providing an apparatus comprising (i) a common controller in data communication with at least one public network, the common controller having user and transaction databases and a processor for generating digital tokens, each digital token representing a particular monetary value and containing a particular digital signature and alterable digital token status data indicating ownership of the digital token, and (ii) a plurality of user data communication interfaces in data communication with the public network;
b) establishing user accounts in the user databases of the common controller;
c) transmitting to the common controller a user identification and PIN to obtain access to the common controller;
d) authenticating the user identification and PIN to determine whether access to the common controller is permitted;
e) generating an application level secure communication channel through which all data communication is to be effected;
f) transmitting data representing a template of an automated teller machine to the user data communication interface of a first user whose identification PIN was authenticated;
g) initiating a financial transaction between the first user and a second user by using the automated teller machine of step (f) to transmit a request to the common controller to effect a transfer of a monetary sum to a destination account;
h) generating a temporary account identified by an account number for temporarily storing the transferred monetary sum;
i) generating multiple digital tokens having a value equal to the monetary sum in the temporary account and data defining a unique digital signature and a digital token status;
j) transmitting to the first user encrypted data representing the temporary account number;
k) decrypting the data transmitted to the first user so as to change the status of the digital token to indicate the amount of e-cash that is subject of a pending transaction;
l) transmitting data to the common controller that authorizes the common controller to transfer the monetary sum from the temporary account to the destination account;
m) transmitting data to the second user representing the e-cash and the account number which identifies the temporary account having therein the monetary sum represented by the digital token; and
n) transmitting data to the common controller to transfer the monetary sum corresponding to the value of the digital token from the temporary account to the destination account and to alter the status of the digital token to indicate ownership of the digital token and update the usage counter in each digital token.

In one embodiment, at least some of the plurality of user data communication interfaces comprise a wireless application protocol network, and a wireless consumer data communication device in data communication with the wireless application protocol network.

In a related aspect, the present invention is directed to a method for effecting a financial transaction over a public network without the submission of sensitive information, comprising the steps of:

a) providing an apparatus comprising (i) a common controller in data communication with one or more public networks, the common controller having user and transaction databases and a processor for generating digital tokens, each digital token representing a particular monetary value and containing a particular digital signature and alterable digital token status data indicating ownership of the digital token, and (ii) a plurality of user data communication interfaces in data communication with the public network;
b) establishing user accounts in the user databases of the common controller;
c) transmitting to the common controller a user identification and personal identification number ("PIN") to obtain access to the common controller;
d) authenticating the user identification and PIN to determine whether access to the common controller is permitted;
e) generating an application level secure communication channel through which all data communication is to be effected;
f) transmitting data representing a template of an automated teller machine to the user data communication interface of a first user whose identification and PIN were authenticated;
g) initiating a transaction between the first user and a second user whereby the first user desires to tender a monetary payment to the second user;
h) using the automated teller machine of step (f) to transmit a request to the common controller to effect transfer of a monetary sum from the account of the first user and the account of the second user;
i) generating a temporary account identified by an account number and transferring the monetary sum from the first user's account into the temporary account;
j) generating multiple digital tokens having a total value equal to the monetary sum in the temporary account and data defining a unique digital signature and a digital token status;
k) transmitting to the first user encrypted data representing the temporary account number which handles current transaction session;
l) decrypting the data transmitted to the first user so as to change the status of the digital tokens to indicate the amount of e-cash that is subject of a pending transaction;
m) transmitting data to the common controller that authorizes the common controller to transfer the monetary sum from the temporary account to the second user's account;
n) transmitting data to the second user representing the e-cash and the account number which identifies the temporary account having therein the monetary sum represented by the digital token;
o) transmitting data to the common controller to transfer the monetary sum corresponding to the value of the digital token from the temporary account to the second user's account and to alter the status of the digital token to indicate ownership of the digital token and update the usage counter in each digital token;
n) closing the temporary account.

The user accounts may be established in data bases other than those of the common controller. The common controller can handle multiple forms of user identification depending upon the type of user end-user devices.

BRIEF DESCRIPTION OF THE DRAWINGS

The features of the invention are believed to be novel. The figures are for illustration purposes only and are not drawn to scale. The invention itself, however, both as to organization and method of operation, may best be understood by reference to the detailed description which follows taken in conjunction with the accompanying drawings in which.

DETAILED DESCRIPTION OF THE INVENTION

In describing the preferred embodiments of the present invention, reference will be made herein to FIGS. 1–13 of the drawings in which like numerals refer to like features of the invention.

In order to facilitate understanding of the present invention, the ensuing description is divided into six parts: (1) System Architecture, and (2) Authentication Process, (3) Withdrawal Process, (4) Deposit Process, (5) Storing Process, and (6) Method of Effecting E-Commerce Transactions.

a) System Architecture

Figure 1:
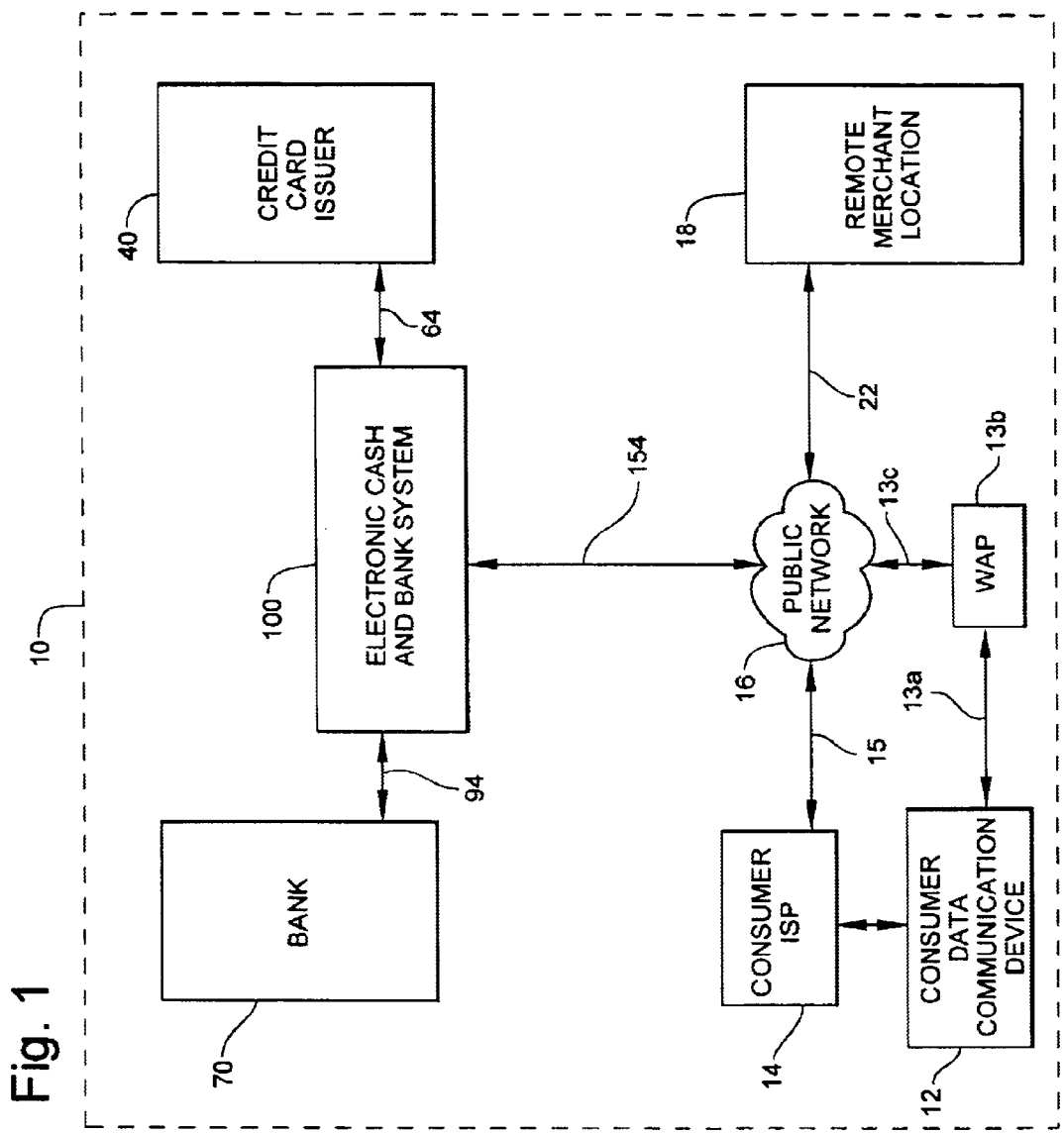
FIG. 1 is a block diagram of a system of the present invention for effecting financial transactions of a public network without the submission of sensitive information.

The principal components used to implement system 10 of the present invention are illustrated in the block diagram shown in FIG. 1. Consumer data communication device 12 can be configured as a personal computer, lap top, personal digital assistant ("PDA"), wireless communications devices (e.g. cell phone), or any hand-held device. If device 12 is realized by a cell phone, then cell phone transmissions 13a are received by WAP (wireless application protocol) network 13b. WAP network 13b processes the wireless data and converts such data into electronic data signals for output to data communication link 13c.

For purposes of the ensuing description, device 12 is realized as a personal computer. Device 12 is employed to access an on-line catalog in which various types of goods and/or services are described and/or illustrated. Device 12 is generally conventional in design and comprises a processor chassis (not shown) within which is disposed a central processor unit (CPU) and supporting integrated circuitry. Coupled to the processor chassis is a keyboard (not shown) and a monitor (not shown). Device 12 is controlled by the customer using the keyboard and a mouse (not shown) or other pointing device that controls a cursor used to make selections in programs executing on device 12. The processor chassis also includes a floppy drive and a hard drive, both of which not being shown but well known in the computer field. In addition, a workstation on a local area network ("LAN".) can be used instead of device 12 for placing an order. Accordingly, it should be apparent that the details of device 12 are not particularly relevant to the present invention. Device 12 simply serves as a convenient interface for accessing information about financial transactions that may be implemented by e-commerce.

Device 12 is connected to Internet service provider 14 which effect data communication between public or Internet network 16 and device 12. As is well known in the art, the actual connection between Internet service provider 14 and network 16 is through a telephone line that is in data communication with a private network service provider ("NSP"). However, the details of the type of connection to the network 16 are of no consequence in the present invention. If wireless communication is used, WAP 13b effects data communication between the wireless communication device (i.e. cell phone) and data communication link 13c. Communication link 13c is in data communication with public network 16.

Network 16 is depicted in FIG. 1 as an amorphous shape to suggest that the details of connection with the customer and the access made by the consumer are continually evolving. When a consumer makes a connection to network 16, the consumer has the ability to access e-bank sites or associated e-commerce sites throughout the world.

Figure 2:
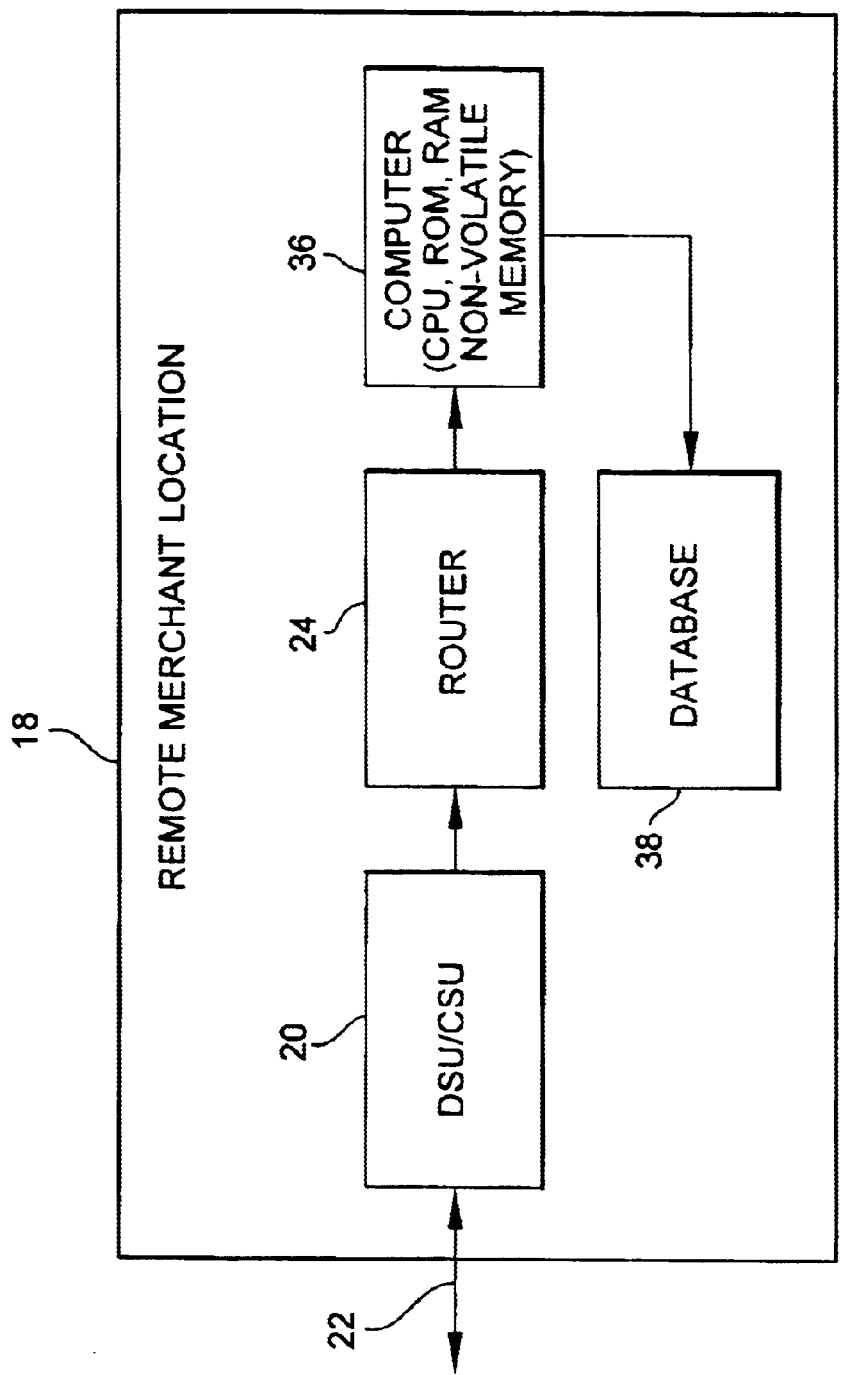
FIG. 2 is a block diagram of a remote merchant location depicted in FIG. 1.

Referring to FIGS. 1 and 2, remote merchant location 18 generally comprises digital service unit/customer service unit ("DSU/CSU") 20 that is connected to network 16 via high-speed data lines 22. DSU/CSU 20 can be configured as any of the suitable commercially available systems such as the ADC Kentrox D-SERV. DSU/CSU 20 is in data communication with router 24. Router 24 can be configured as any of the suitable commercially available routers such as the Livingston POSTMASTER or those made by CISCO Systems. Router 24 is in data communication with computer 26. In one embodiment, computer 26 comprises a SUN SPARC5 minicomputer, which includes a CPU, RAM, ROM, and non-volatile storage (a high-speed hard drive—not separately shown). Remote merchant location 18 further includes database 38 for storing data pertaining to all transactions, including customers, orders, products purchased, prices, back orders, etc. In the memory of computer 36 are stored application programs that execute on the CPU. Among these programs for use in the present invention are an ORACLE database management system and custom software. The programs or software comprise machine instructions that instruct the CPU within computer 26 to implement the steps of the present invention, generally as explained below.

Figure 3:
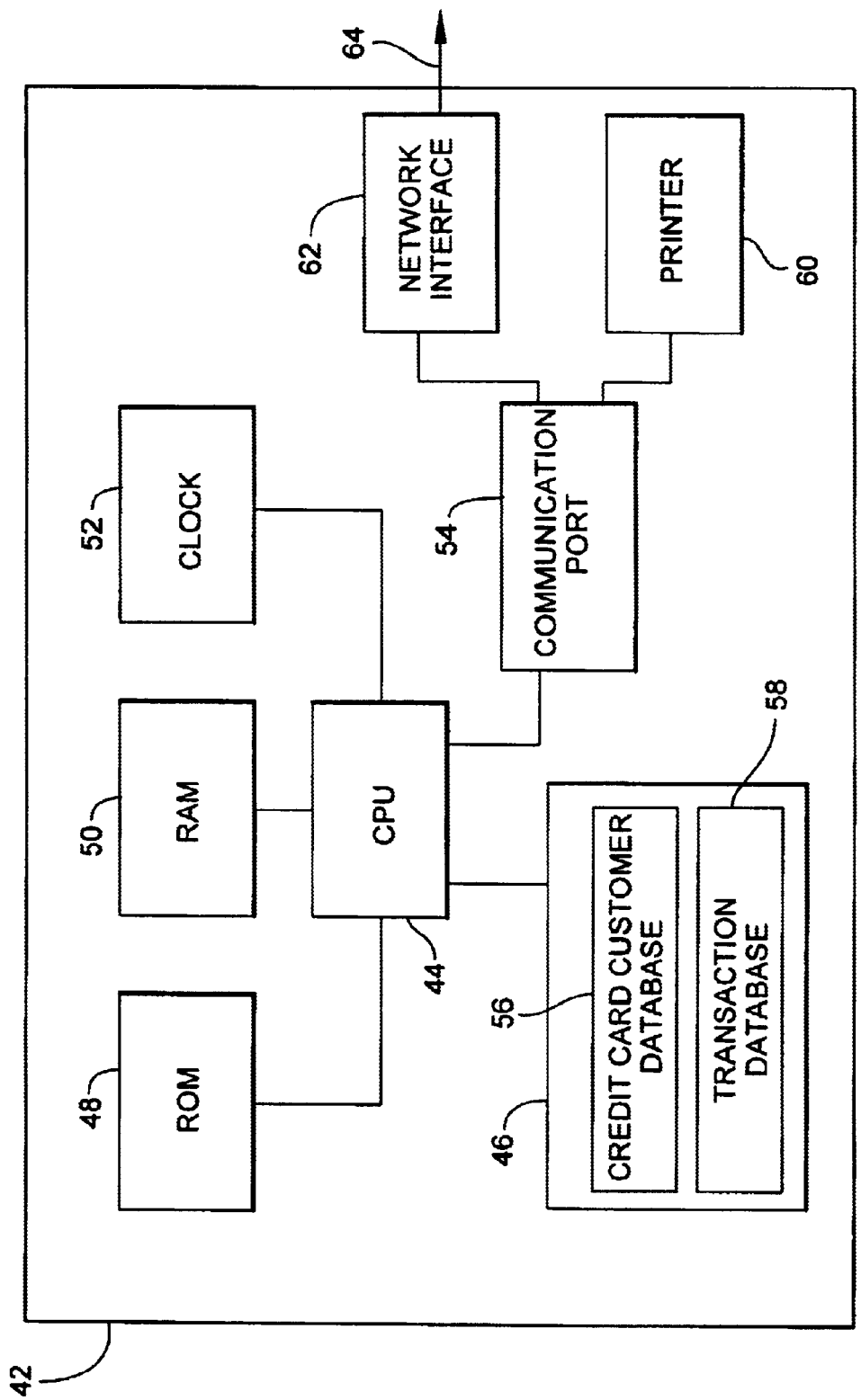
FIG. 3 is a block diagram of a credit card issuer depicted in FIG. 1.

Referring to FIG. 3 there is shown a block diagram of credit card issuer 40 which was depicted in FIG. 1. Credit card issuer 40 generally comprises processor 42. Processor 42 preferably includes certain standard hardware components, such as a central processing unit (CPU) 44, a data storage device 46, a read only memory (ROM) 48, a random access memory (RAM) 50, clock 52, and communications port 54. The CPU 44 is preferably linked to each of the other listed elements, either by means of a shared data bus, or dedicated connections, as shown in FIG. 3. CPU 44 may be embodied as a single processor, or a number of processors operating in parallel. Data storage device 46 and/or ROM 48 are operable to store one or more instructions which CPU 44 is operable to retrieve, interpret and execute. CPU 44 preferably includes a control unit, an arithmetic logic unit (ALU), and a CPU local memory storage device, such as, for example, a stackable cache or a plurality of registers, in a known manner. The control unit is operable to retrieve instructions from the data storage device 46 or ROM 48. The ALU is operable to perform a plurality of operations needed to carry out instructions. The CPU local memory storage device is operable to provide high speed storage used for storing temporary results and control information.

Referring to FIG. 3, data storage device 46 preferably includes a credit card customer database 56 and a transaction database 58. The credit card customer database 56 preferably stores biographical information on each customer, as well as the credit limit associated with each credit card account. The transaction database 58 preferably stores information required by the credit card issuer 40 for each transaction made by a customer, including the received billing descriptor and purchase amount for each item. The information stored in the transaction database 58 may be utilized by the credit card issuer 40 to generate the credit card billing statements. In one embodiment, communications port 54 is connected to a printer 60 which may be utilized, among other things, to print credit card billing statements. Communications port 54 connects the credit card issuer 40 to a network interface 62, thereby linking the credit card issuer 40 to data link 64. Data link 64 can be configured as dedicated data lines, cellular, personal communication systems ("PCS"), microwave or satellite networks.

Figure 4:
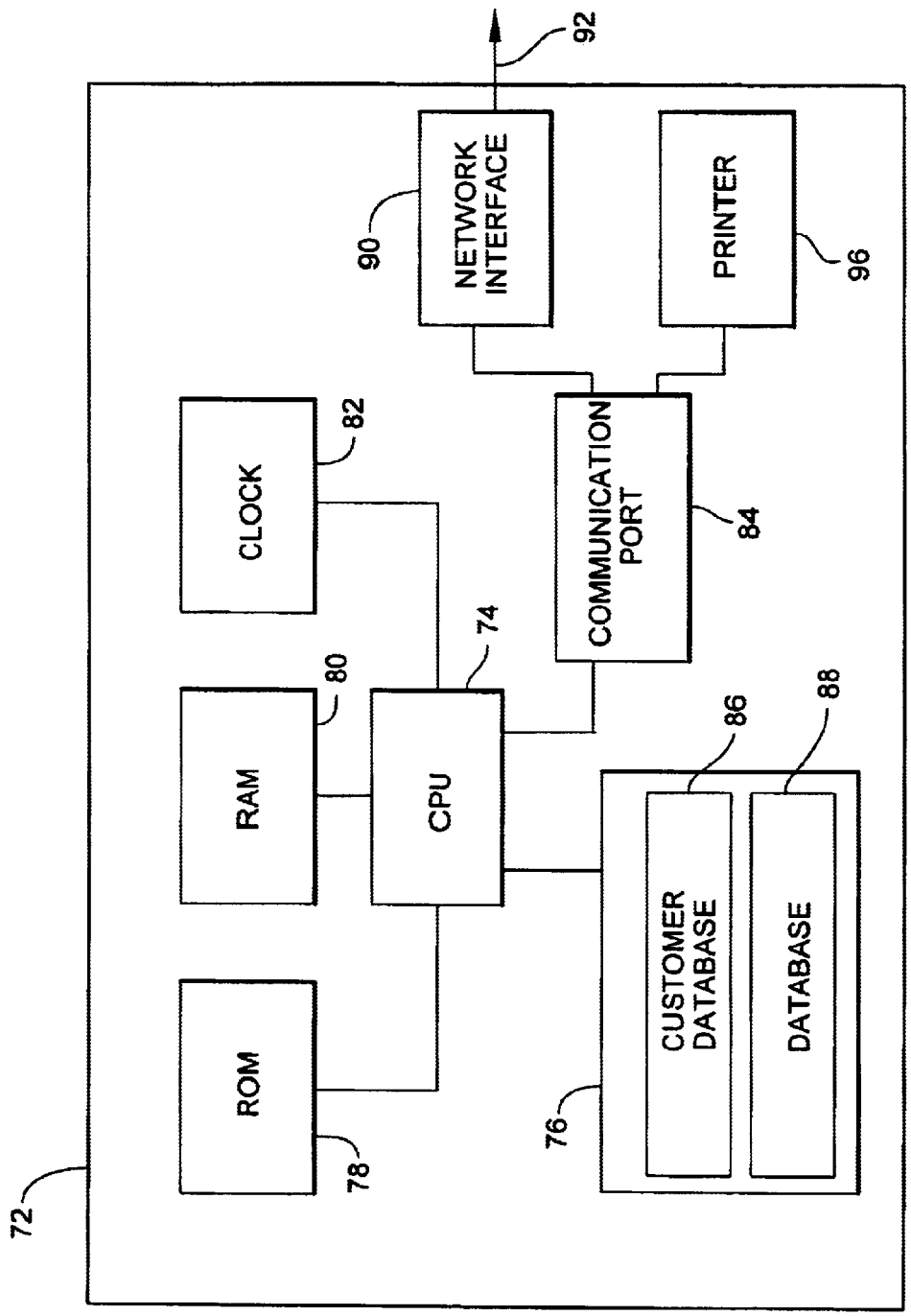
FIG. 4 is a block diagram of a bank depicted in FIG. 1.

Referring to FIG. 1, bank 70 performs all of the banking functions known in the banking field. However, in accordance with the present invention, bank 70 utilizes data communication, processing and storage architecture that will now be described. Referring to FIG. 4, there is shown a block diagram that is architecturally illustrative of processor 72 which may be utilized by bank 70. Processor 72 preferably includes certain standard hardware components, such as a central processing unit (CPU) 74, a data storage device 76, a read only memory (ROM) 78, a random access memory (RAM) 80, a clock 82, and a communications port 84. The CPU 74 is preferably linked to each of the other listed elements, either by means of a shared data bus, or dedicated connections, as shown in FIG. 4. The CPU 74 may be embodied as a single processor, or a number of processors operating in parallel, in the manner described above for the CPU 44 (see FIG. 3). Data storage device 76 and/or ROM 78 are operable to store one or more instructions which the CPU 74 is operable to retrieve, interpret and execute. Data storage device 76 preferably includes a customer account database 86 and an e-commerce database 88. Customer account database 86 stores the typical banking data which banks process on a daily basis, e.g. deposits, withdrawals, transfers, conventional ATM (automated teller machine) transactions, checking transactions, etc. E-commerce database 88 stores all data pertaining to customer's transactions that involve electronic bank and cash system 100 (discussed in the ensuing description). Communications port 84 connects bank 70 to a network interface 90, thereby linking bank 70 to data link 92. Data link 92 can be configured as dedicated data lines, cellular, personal communication systems ("PCS"), microwave or satellite networks. Bank 70 further includes printer 76 which is connected to communications port 84 for printing reports, summaries, statements, etc. concerning customers' e-commerce transactions.

Figure 5:
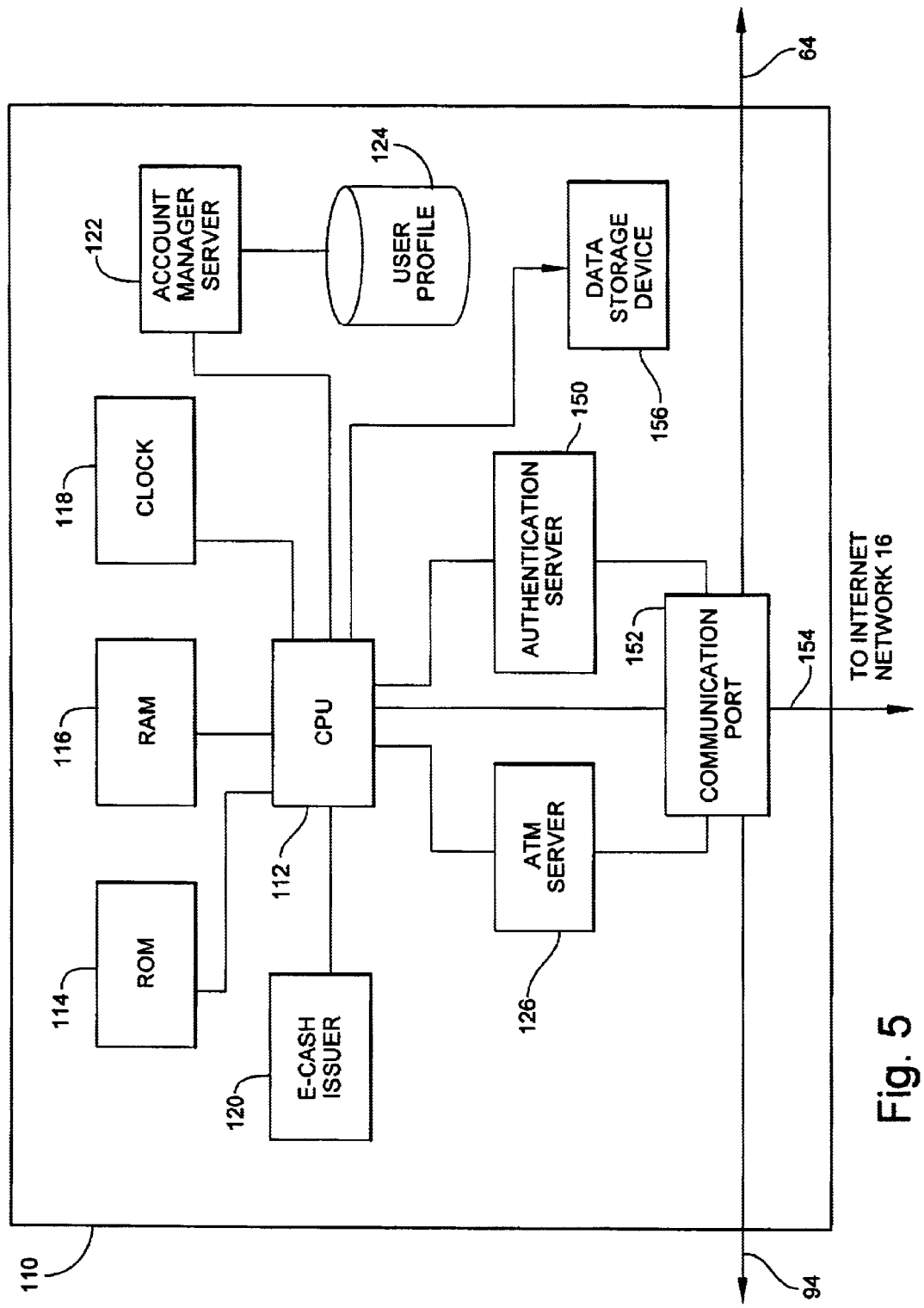
FIG. 5 is a block diagram of an electronic cash and bank system of the present invention which is depicted in FIG. 1.

Referring to FIGS. 1 and 5, electronic bank and cash system 100 (referred to herein as "e-bank 100") is in data communication with network 16 and credit card issuer 40. Referring to FIG. 5, there is shown a block diagram that is architecturally illustrative of processor 110 which may be utilized by e-bank 100. Processor 110 preferably includes certain standard hardware components, such as a central processing unit (CPU) 112, a read only memory (ROM) 114, a random access memory (RAM) 116, and a clock 118. Processor 110 further includes e-cash issuer 120. E-cash issuer 120 generates what will be referred to herein as "Internet cash" or "e-cash" (i.e. electronic cash). The e-cash cannot be replicated or altered but yet, is easily transferable. The "Internet cash" or "e-cash" is referred to herein as a "digital token" or "electronic token". The "electronic token" is a group of electrically represented bits, which can be electronically transmitted and stored, and which has some agreed upon monetary value that will be honored by providers of financial services (i.e. credit card issuer 40, and bank 70) as well as merchants and vendors. The aforementioned group of electrically represented bits of the electronic token can also be stored at the user's portable device such as Smart Card, e-wallet, etc. Each electronic token can have any value, such as, for example, 1 cent, 10 cents, 25 cents, $1, $2, $5, $10, $20, $50 or $100. However, it is to be understood that the electronic tokens can have other values as well. In one embodiment, each electronic token has the following information: (i) a unique serial number to facilitate tracking, (ii) the date the electronic token is issued, (iii) the date of the last transaction, if any, (iv) the number of times the electronic token has been used in transactions, (v) the status of the token, and (vi) a digital signature using the aforementioned information and private key of the e-bank 100. The serial number is created by e-cash issuer 120. The status of the electronic token includes the following information: (i) whether the electronic token is currently owned by someone, (ii) whether the electronic token is involved in a pending transaction, or (iii) whether the electronic token is not usable. Thus, the electronic token is comprised of a data block that contains all of the information described above in digital form. Other than the aforementioned information, the electronic token does not contain any other information relating to the payer or payee. Thus, the electronic token provides the following advantages and benefits:

a) the security of the electronic tokens does not depend upon physical location;

b) the electronic tokens cannot be copied and used again, i.e. double spending is prevented;

c) a consumer can use the electronic tokens to purchase goods from merchants over network 16 without having to disclose personal financial information to the merchants;

d) the electronic tokens can be transferred to others; and e) the privacy of the consumers is protected so that no one can trace the relationship between a consumer and his or her purchases.

Referring to FIG. 5, processor 110 further includes account manager server 122 and user profile database 124. Server 122 and database 124 maintains the profiles of all users of e-bank 100 and the users' account information. Account manager server 122 and user profile database 124 function as a central management point. In one embodiment, database software such as Oracle7, manufactured by Oracle Corporation, is used to create and manage these database 124.

Figure 6:
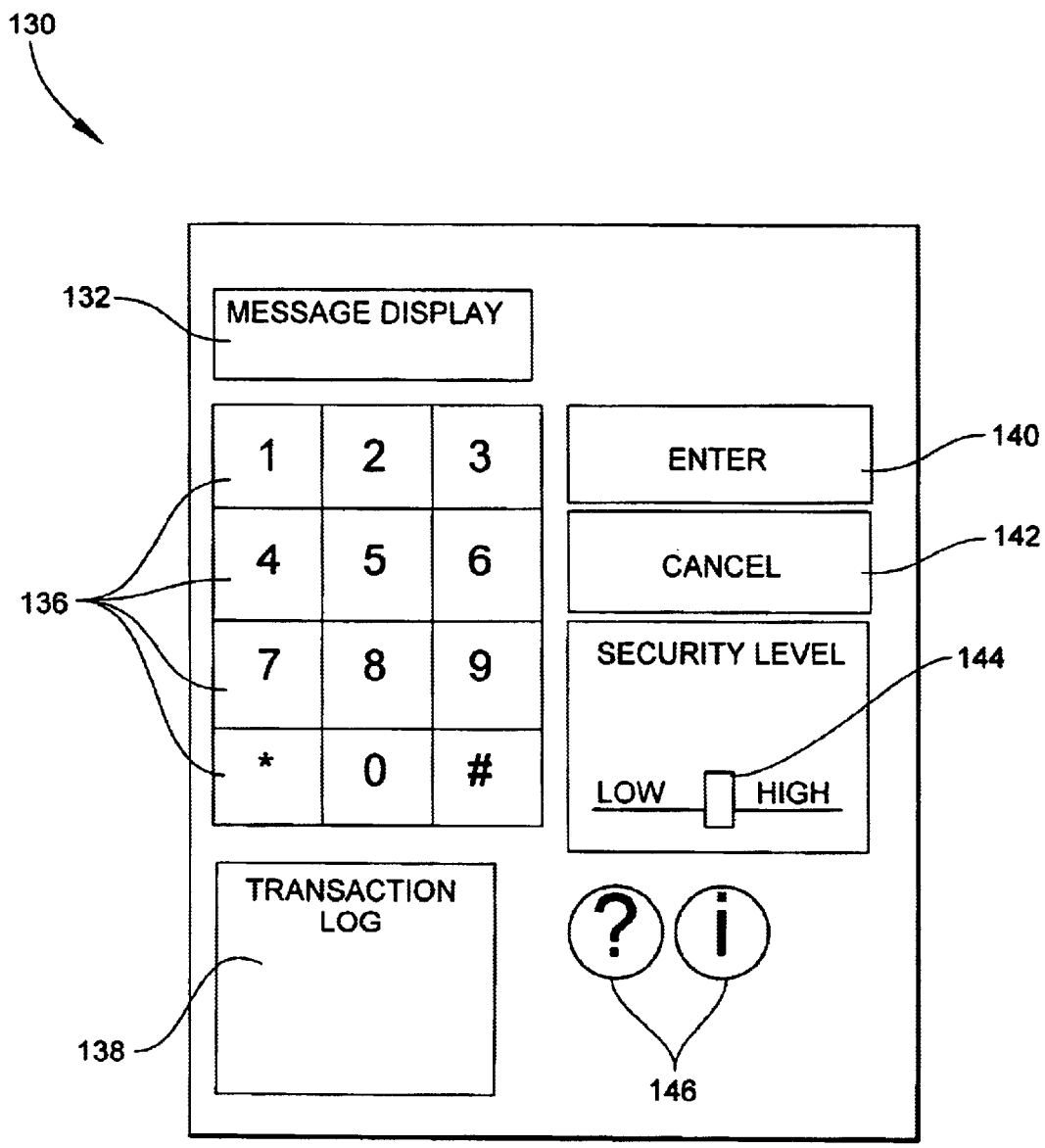
FIG. 6 illustrates the graphical image of an Internet teller machine that is displayed via a consumer data communication device in accordance with the present invention.

Processor 110 further includes ATM (automated teller machine) server 126. ATM server 126 is in data communication with network 16 and data links 64 and 94. Thus, ATM server 126 is in data communication with credit card issue 40 and bank 70. Server 126 effects transfers of funds from the user's credit card or debit card to the user's account in account manager server 122. In accordance with the present invention, the ATM server 126 also is configured to generate an image of a typical ATM with a unique security component that is explained in the ensuing description. One example of such an image is shown in FIG. 6. ATM image 130 comprises graphics that define message display 132, number keys 136, transaction log display 138, enter key 140, cancel key 142, security level adjustment knob 144, and icons 146. Transaction log display 138 displays the history of the user's transaction activity. The information displayed in transaction log display 138 is generated by account management server 122. The information in transaction log display 138 can also be downloaded by the user. This will be explained in detail in the ensuing description. Security level adjustment 144 enables a user to set the user's security level to a "LOW" setting, for improved performance, or to a "HIGH" setting, for highly sensitive data. Icons 146 functions as "help" buttons and provide the user with a context sensitive help message. The use of ATM image 130 will be discussed in detail in the ensuing description.

Referring to FIG. 5, processor 110 further includes authentication server 150 which authenticates customers and authorizes those customers to make transactions with e-bank 100. In order to effect authentication and authorization, authentication server 150 processes data received from account manager server 122. Processor 110 further includes communication port 152. Communication port 152 generally comprises data receiving, interface and multiplexing circuitry to effect data communication between (i) ATM server 126 and data link 154, (ii) ATM server 126 and data link 94, (iii) ATM server 126 and data link. 64, (iv) authentication server 150 and data link 154, (v) authentication server 150 and data link 64, and (vi) authentication server 150 and data link 94. Thus, ATM server 126 and authentication server 150 are in data communication with Internet network 16, credit card issuer 40 and bank 70.

Referring to FIG. 5, processor 110 further includes data storage 156 which functions as a "claim pool" or "escrow account". Specifically, the payer in a transaction will obtain payment by withdrawing funds from the claim pool. One significant function of the claim pool and escrow account is to ensure the one-time use of e-cash per transaction. This process, is described in detail in the ensuing description.

b) Registration Process

In order for consumers and merchants to use e-cash at e-bank 100, they must first register. This procedure is similar to the registration processes of many Internet communities such as AOL (America On-Line), AT&T Worldnet, Amazon.com, E-bay, Priceline.com, Deja News, Yahoo, Excite, etc. In order to register, the consumers and merchants must log onto the Internet, call up the interactive web site of e-bank 100 and provide the following information:

| Consumer | Merchant, Business or Vendor |
| --- | --- |
| Name | Company/Business Name |
| Address | Officer Name or Authorized Person |
| Phone Number | Company Address |
| Credit Card an/or Debit Card Number PIN (personal identification number) code | DUNS: D&B Number |

In one embodiment of the invention, registration is not required if the users (i.e. consumers or merchants) want to transfer funds just using existing financial accounts at other banks or with a credit card.

The PIN code is the code that consumers typically use to be authenticated at e-bank. Account manager server 122 processes all of this information and creates a user profile that is stored in data base 124. This is the only time that a consumer submits such personal and sensitive information over Internet network 16.

c) Authentication Process

After the registration process, e-bank 100, via account manager server 122, generates an electronic identification card ("EID"). E-bank 100 uploads the EID and makes it available to the user who can download the EID securely and store it onto any medium, e.g. hard drive, floppy disk, CD-ROM, etc. These hardware components are typically part of device 12 (see FIG. 1). The EID contains user demographic information, user identification ("user ID"), and a certificate with digital signature generated by e-bank 100. Account manager server 122 then requests that the user select a password and submit the selected password. Account manager server 122 then confirms that an EID has been generated by server 122 and downloaded by the user, and that the user's password has been received. In other embodiments, other personal identifications are used instead of the. EID. For example, a user's cell phone number or the user's device ID can be used in place of the EID.

The user then calls up the interactive web site of e-bank 100. The web site of e-bank 100 displays a plurality of icons and the Authentication Process starts automatically. The Authentication Process is controlled by authentication server 150. If the personal ID is verified by Account Manager Server 122, the user will be prompted for the PIN. Otherwise, the user will be logged in as a guest. The first step in this process entails server side certification by Certificate Authority. In order to accomplish this, the user's browser automatically requests a certificate from e-bank 100. The certificate is then verified by the Certificate Authority. If the certification process is successful, the interface of e-bank 100 is launched into the user's browser. The client interface will now try to connect back to the server using a secure tunnel using the exchanged session key. If the secure tunnel is established, authentication server 150 then generates a prompt which requests that the user submit the EID and PIN. If the EID is not found at the default location, the user specifies the location of the EID using key icons 136 so as to enable the EID to be sent to authentication server 150. If client interface fails three times to send the EID, authentication server 150 terminates the session. If authentication server 150 verifies the EID, then server 150 establishes a half-session and initiates a secure connection by encrypting data at the application level. In one embodiment, the encryption scheme is RSA which is known in the field of encryption. However, other schemes known in the art can also be used, e.g. DES III.

In an alternate embodiment, the user ID and password are used for the authentication process instead of EID and PIN. In such an embodiment, authentication server 150 prompts the user for his or her user ID and password. The user then inputs the user ID and password via the keyboard. Authentication server 150 then interacts with account manager server.122 to verify the EID, and matching user ID and password. Thus, the SSL initiated by server 150 effects the creation of a "secure communication tunnel" or "secure communication channel" through which the user's EID, ID and password are transmitted. Authentication server 150 then initiates a session. In one embodiment of the present invention, the SSL is terminated prior to initiation of the session. In another embodiment, the SSL is maintained throughout the session.

In an alternate embodiment, the authentication process is significantly modified. Specifically, after the registration process, a dynamic electronic token generator ("DETG") and PIN (personal identification number) are sent to the user via registered mail. In one embodiment, the DETG is configured in CD-ROM form. Next, the user then calls up the interactive web site of e-bank 100. The web site of e-bank 100 displays a plurality of icons, one of which being labeled "Authentication". The user then uses a keyboard or mouse to activate (or "click") on this icon to begin the Authentication process which is controlled by authentication server 150. The server side certification process, as described above, is then implemented. After the server side certification is successfully verified by Certificate Authority. Authentication server 150 then generates an e-bank interface and launches this interface into the user's browser. Authentication server 150 then generates a prompt which requests that the user submit an electronic token and PIN. Authentication server 150 interacts with account manager server 122 to verify the digital token and matching PIN. If verification is made, a session is established.

d) Transfer Process

In accordance with the present invention, a user may transfer money from a conventional bank 70 or other financial institutions (e.g. credit card issuer 40) to e-bank 100. In order to accomplish such transfers, the user activates his or her user device (i.e. consumer data communication device 12) and connects to ITM interface 130. Alternatively, if consumer data communication device 12 is personal computer, the user can launch the ITM application in his or her computer. The user's certificate is then read and transmitted over to e-bank 100 which proceeds with the authentication process as described above. If the user uses a cell phone ID, or a PDA device that is considered to be personal, a digital certificate may not be necessary. After the user's identity is verified and logged in by account manager server 122, ITM interface 130 provides a Transfer Fund Menu. If the user desires to transfer funds from a conventional bank or other financial institution to e-bank 100, the user inputs the conventional bank account number or the account number in another financial institution. If the user's are registered, then these account numbers may be stored in account manager server 122 and user profile data base 124 thus preventing the user from having to continuously re-enter this data. If the user is taking a cash advance on his or her credit card, the user also inputs his or credit card number. The user then inputs the amount of money to be transferred. The amount of money entered by the user will be withdrawn from the conventional bank or credit card company, converted into e-cash by e-cash issuer 120 and stored in the user's account in account manager server 122. The electronic tokens-are encrypted by the user's public key so that only the user can decrypt the electronic tokens and use them.

In accordance with the present invention, a user may also transfer funds from e-bank 100 to a conventional bank 70 or other financial institutions. This function allows a user to redeem his or her e-cash and convert it into conventional money. In order to accomplish this function, the user inputs the amount of money to transfer. The user inputs the conventional bank account number or an account number in another financial institution. If the user's are registered, then these account numbers may be stored in account manager server 122 and user profile data base 124 thus preventing the user from having to continuously re-enter this data. The amount of money entered by the user is then withdrawn from e-bank 100 and deposited or credited to the account numbers of the conventional bank 70 or other financial institution. CPU 112 and account server manager 122 cooperate to generate a transaction log number and a receipt certificate. The receipt certificate contains the transaction log number and is transmitted to the users. When the user receives the receipt certificate, that particular transaction is complete and the use may log. out if no other transactions are desired.

e) Withdrawal Process

Although a user may want to withdraw e-cash for a variety of reasons, the primary reason will be to pay a merchant or vendor. In order to accomplish such transfers, the user activates his or her user device (i.e. consumer data communication device 12) and connects to ITM interface 130. Alternatively, if consumer data communication device 12 is personal computer, the user can launch the ITM application in his or her computer. The user's certificate is then read and transmitted over to e-bank 100 which proceeds with the authentication process as described above. If the user uses a cell phone ID, or a PDA device that is considered to be personal, a digital certificate may not be necessary. After the user's identity is verified and logged in by account manager server 122, ITM interface 130 provides a Withdrawal Fund Menu. The Withdrawal Fund Menu allows the user to input data that defines how the user is going to pay another party (i.e. merchant). The user can select form the following options: (i) charge the payment to a phone bill or cell phone bill, (ii) charge the payment to a credit card. (iii) debit the payment from the user's account in e-bank 100, or (iv) debit the payment from the user's account in conventional bank 70. Next, the user is provided with the following choices that define where the payment is to be directed: (i) the phone number of the payee, (ii) the e-mail address of the payee, or (iii) the payee's account number in e-bank 100. After the payment is made, CPU 112 and account server manager 122 cooperate to generate a transaction log number and a receipt certificate. The receipt certificate contains the transaction log number and is transmitted to the payer and payee. When the payer and payee receive the receipt certificate, that particular transaction is complete and the payer and payee may log out if no other transactions are desired.

When a payer make a payment as described above, the digital token is decrypted. As a result of the decryption: (i) the status of the electronic tokens is changed to Pending, (ii) the date and time of the last transaction, (iii) the number of hops ("NOH") is incremented, and (iv) CPU 112 and e-cash issuer 120 cooperate to generate a new digital signature on the electronic tokens. CPU 112 routes the e-cash to the claim pool realized by the data storage device 156. Data confirming the transaction is generated by CPU 112 and inputted into communications port 152. Communications port 152 transmits this information over data link 154 to Internet network 16. As previously described in the foregoing description, all data transmitted from e-bank 100 to ITM interface 130 is transmitted over Internet network 16 through the secure communications tunnel created by ITM interface 130. In one embodiment, the confirming data consists of an image of the requested e-cash (i.e. the proper combination of the electronic tokens to meet the requested amount) is displayed to the user via ITM interface 130. The user then copies and pastes the image of the e-cash to the vendor's payment form and then submits the vendor's payment form to the vendor via Internet network 16. The user may keep any unused e-cash in his or her local file or other data storage area.

f) Storing Internet Cash

In accordance with the present invention, a user (consumer or merchant) may use ATM interface 130 to withdraw the e-cash from his or her account and safely download it into any storage medium, e.g. computer hard drive, floppy, writeable CD, etc. The user can also make multiple copies of the e-cash for purposes of back-up. However, if the e-cash is used to pay another party or is deposited back to e-bank 100, the stored copies of e-cash is no longer useable. An "e-cash Download log" is part of each user's account in account manager 122. The "e-cash Download log" contains data pertaining to the date and time of the download of e-cash as well as the amount of e-cash. In order to store e-cash, the user generally follows the same process as the "withdraw process" described in the foregoing description. Specifically, the user uses ATM server interface 130 to store the cash that he or she owns. The user then inputs his or her request using the appropriate icons on interface 130. In response, ATM server 126 issues a request to account manager server 122, via CPU 112, to update the user's Download Log. Next, the interface 130 asks the user for (i) the location of the storage device on which the e-cash is to be stored, and (ii) permission to proceed with the e-cash download process. The user then "clicks" on the appropriate icons of interface 130 to initiate the download process. The user saves the downloaded e-cash as file.

If the user loses the storage device on which the e-cash is stored, the user must notify e-bank 100 via ATM server interface 130 as soon as possible. Such a request effects the initiation of an examination of the user e-cash Download Log in account manager server 122 to locate the data that pertains to the transaction wherein the "lost" e-cash was originally downloaded. When such data is located, account manager server 122 will change the status of the e-cash to "inactive". Thus, no other party will be able to use the lost e-cash.

g) Prevention of fraudulent or counterfeit e-cash, duplication of e-cash, and multiple use of e-cash All e-cash is "signed" by e-bank 100 with its private key. If any information of the e-cash is altered, the signature would not match that of e-bank 100. No other party would be able to generate the same signatures. Since the secure communications channel is created between interface 130 and e-bank 100, the e-cash is not exposed in public. Even if a user (consumer or merchant) does not support a secure communications channel (SSL) and the e-cash is copied by an intruder for later use, the dynamic fields of the e-cash (e.g. hop count, last transaction, etc.)

h) The Virtual Mall

In accordance with the present invention, the method and system of the present invention is used to implement a "virtual mall". Such a configuration is shown in FIGS. 7–12.

In such an embodiment, a plurality of remote merchant locations are in data communication with Internet Network 16 in the same manner as merchant locations shown in FIG. 1. In such a configuration, the consumer uses e-bank 100, via Internet Network 16, to transact with merchants that are grouped together to form a "mall". Each step of the process of "shopping" at the "virtual mall" is described in detail in the ensuing description. For purposes of this ensuing description, it is assumed that the consumer has already completed the registration process which was described in the foregoing description.

The first step of shopping at the virtual mall entails the consumer effecting data communication with network 16 and calling-up the location of the Internet web site of e-bank 100.

Next, the consumer initiates the Authentication Process and Server Certification which was previously discussed herein.

Figure 7:
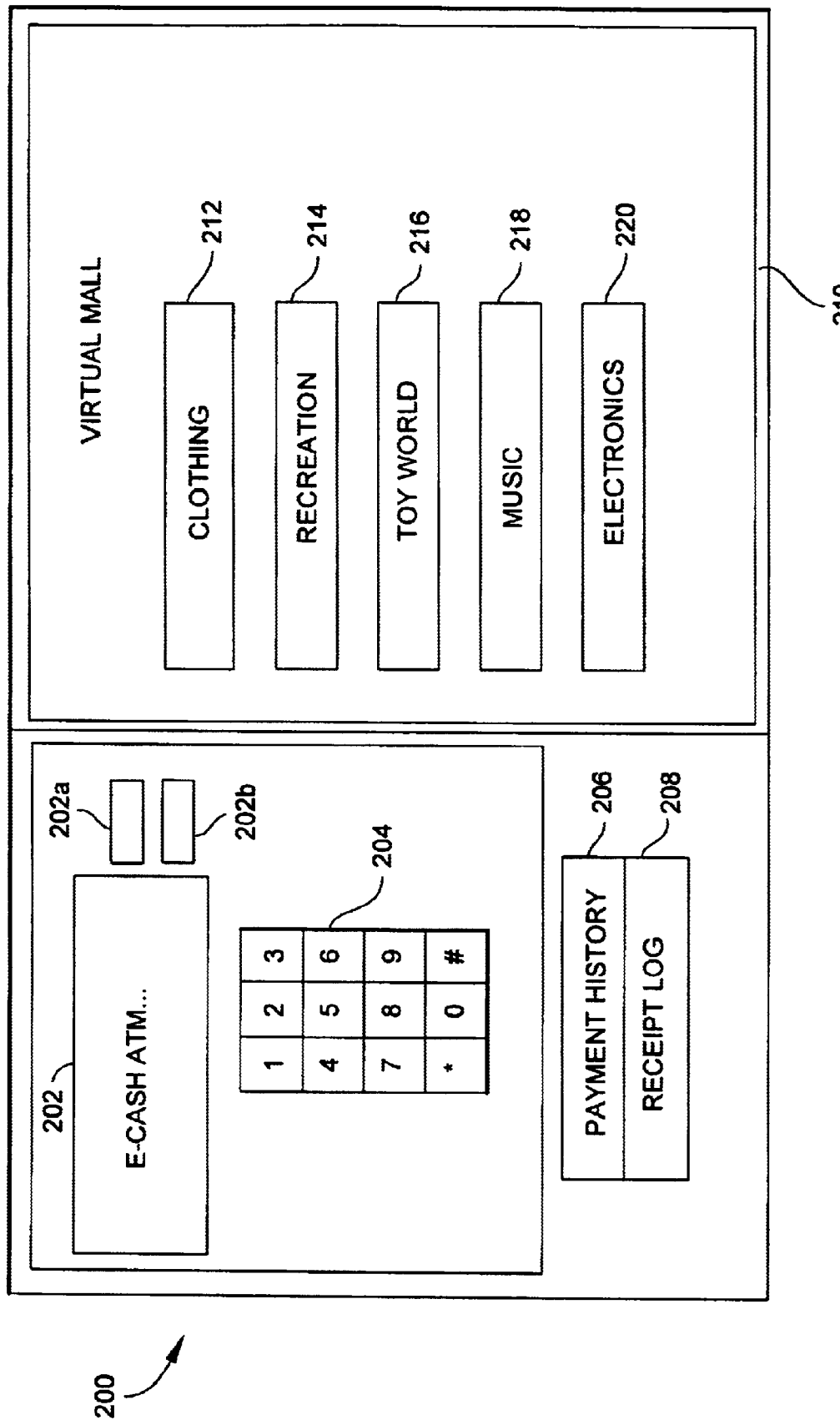
FIGS. 7–12 illustrate an alternate embodiment of the Internet teller machine of FIG. 6 which is configured to allow a consumer to use the system of the present invention, shown in FIG. 1, to shop at a virtual mall.
Figure 8:
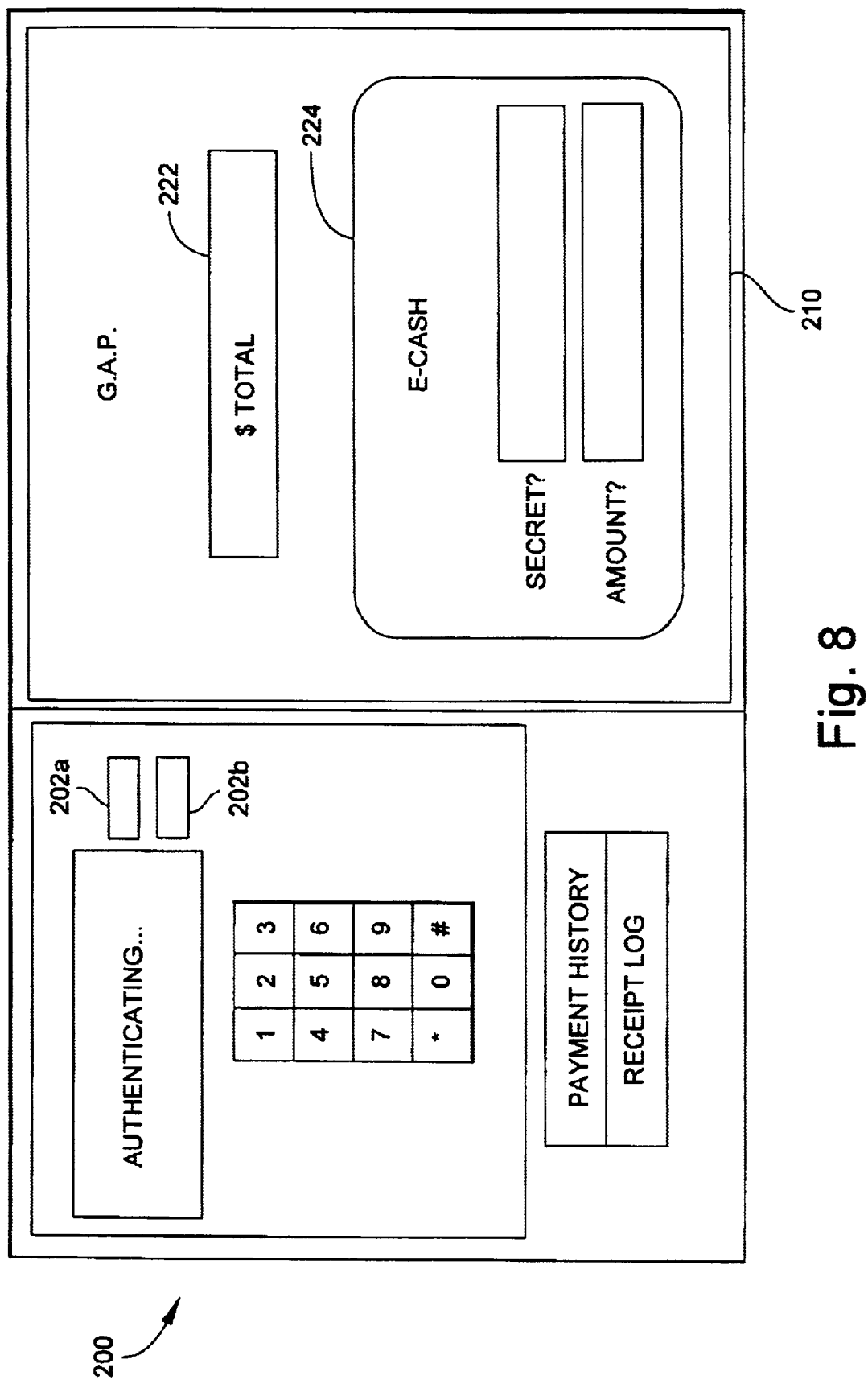

Referring to FIG. 7, after the steps above have been completed, interface 200 of e-bank 100 is launched into the consumer's (or user's) browser in a manner similar to that of interface 130 previously discussed herein. Interface 200 includes a message display 202, keyboard icons 204, Payment History icon 206, Receipt Log icon 208 and Virtual Mall display 210. Message display 202 displays information relating to transactions with e-bank 100. The purpose of Payment History icon 206 and Receipt Log icon 208 are discussed below. Virtual Mall display 210 includes a plurality of icons 212, 214, 216, 218 and 220 that represent particular categories of goods (e.g. clothing, recreation, toys, etc.).

Figure 9:
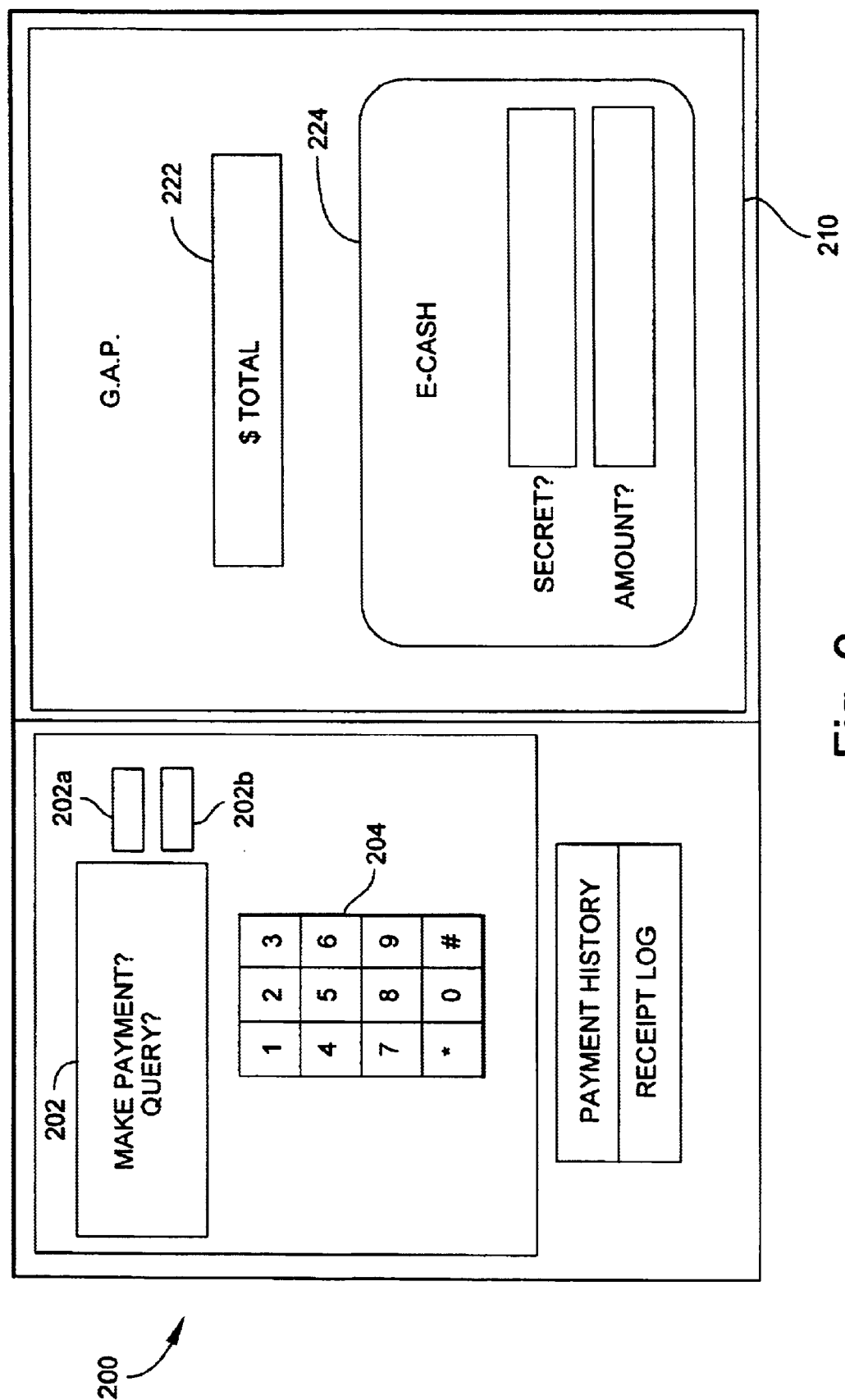
Figure 10:
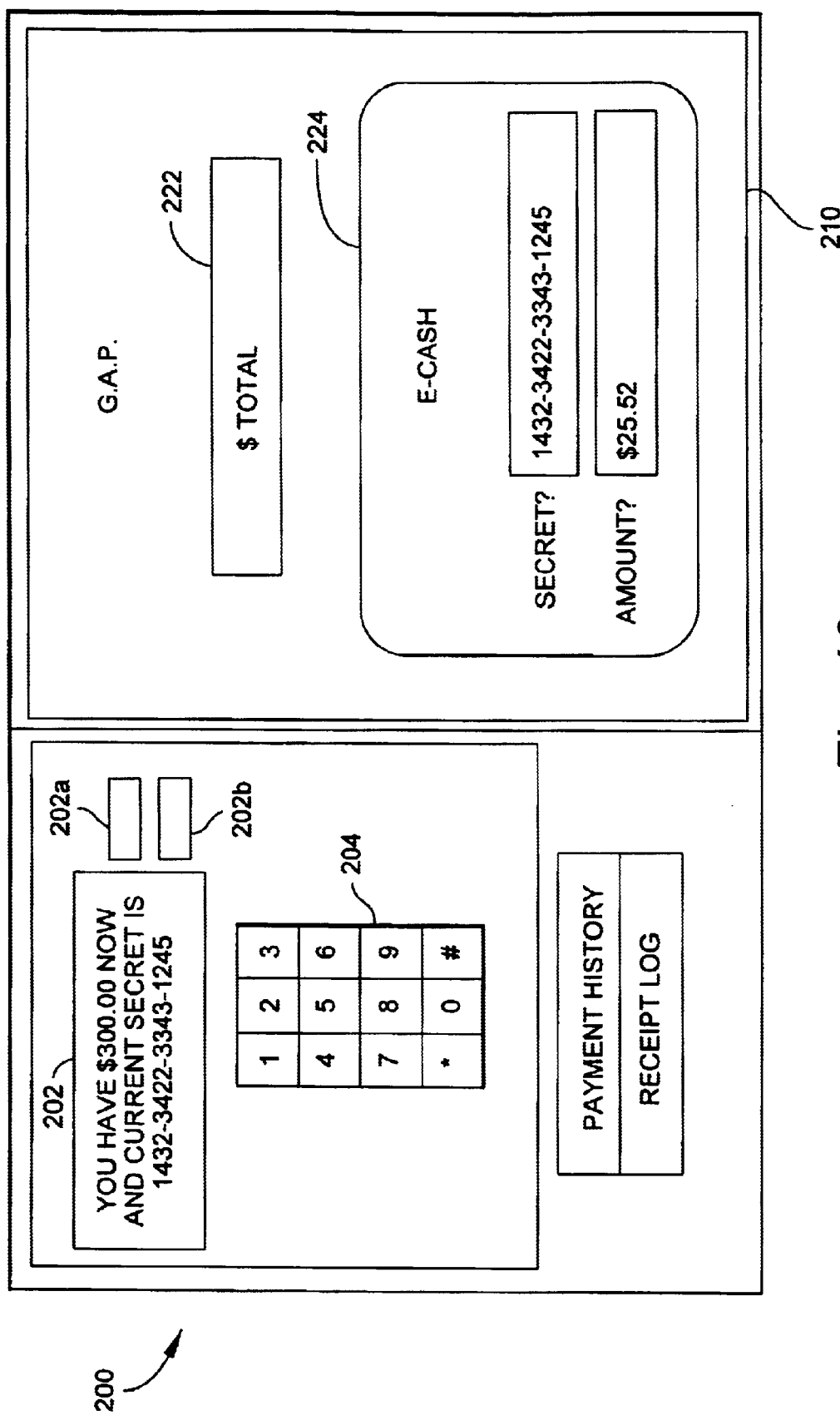

For purposes of example, the consumer "clicks" on icon. 212 for "clothing". A listing of the names of clothing stores appears on display 210. For purposes of example, the user "clicks" on the icon displaying the name of a currently popular clothing store "GAP". An interface of GAP is launched into the consumer's browser. The consumer is able to search various categories of clothing offered by the GAP and can select items for purchase. In one embodiment, an icon displaying the text "Add Item To Shopping Cart" is displayed to enable the consumers to select a desired item. Such generation of the "Add Item To Shopping Cart" icon is well known in the field of interactive electronic shopping systems. Once the consumer is finished with his or her purchase, display 210 displays box 222 which contains the total amount of the purchase (see FIG. 8). Referring to FIG. 9, the consumer manipulates keypad icons 204 to enable display 202 to display a plurality of menu choices. In this particular example, display 202 displays "Make Payment?" and "Query". Since the consumer desires to complete the transaction, the consumer clicks on "boxes" 202*a* which corresponds to "Make Payment?". This is illustrated in FIG. 9. The consumer then uses keypad icon 204 to-input the amount of e-cash requested and the EID. In this particular example, the consumer has requested $300. In response to this input of information, e-bank 100 creates a temporary account in the "claim pool" which is realized by data storage device 156 shown in FIG. 5. The requested amount of e-cash is deposited into the temporary account. E-bank 100 provides a number that identifies the temporary account number. In one embodiment, e-bank 100 labels this temporary account number as "Secret". As shown in FIG. 10, e-bank 100 provides the e-cash and the temporary location of the e-cash. In response, the consumer inputs the "Secret" and the Amount to withdraw from the temporary account identified by the Secret.

Figure 11:
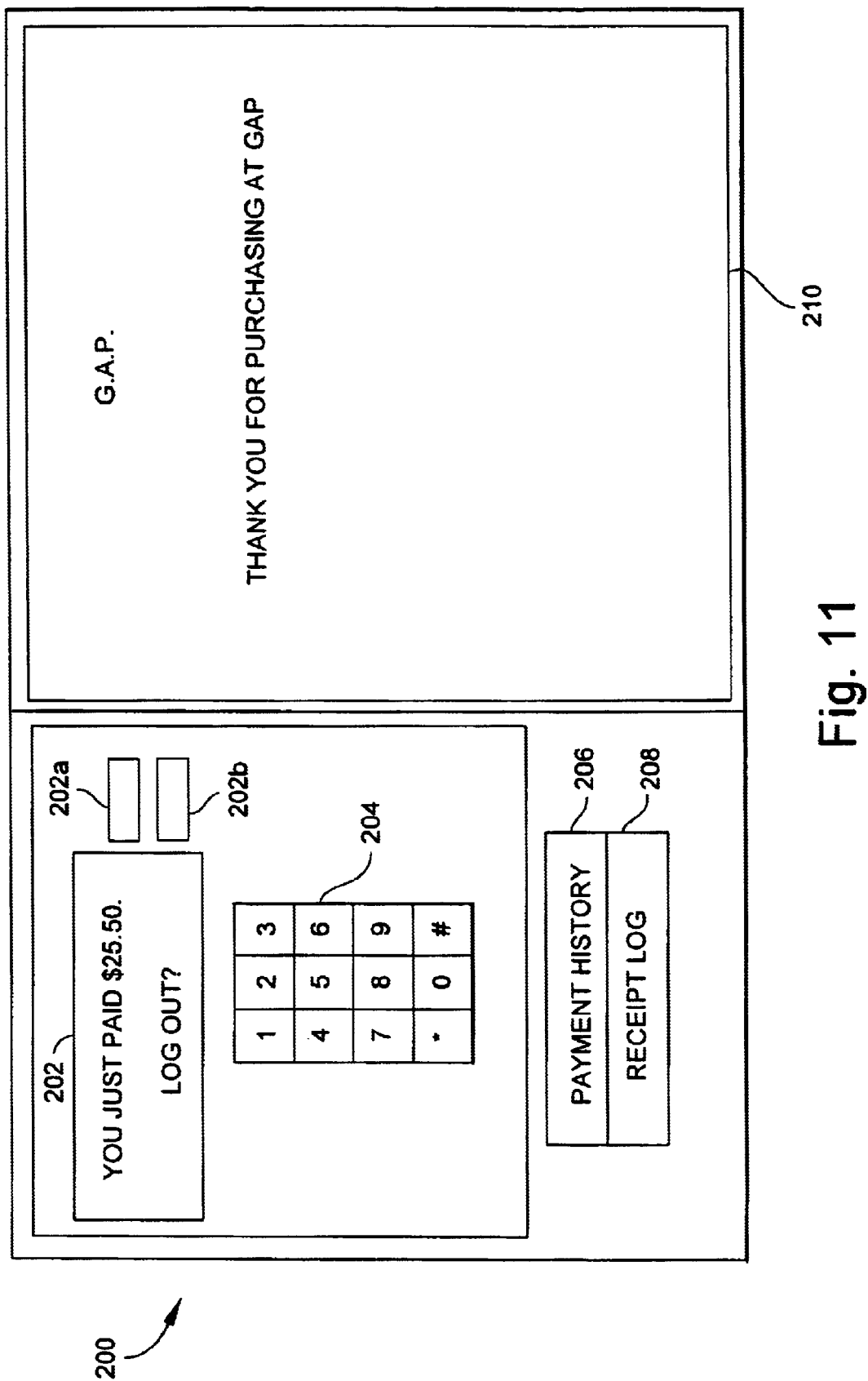
Figure 12:
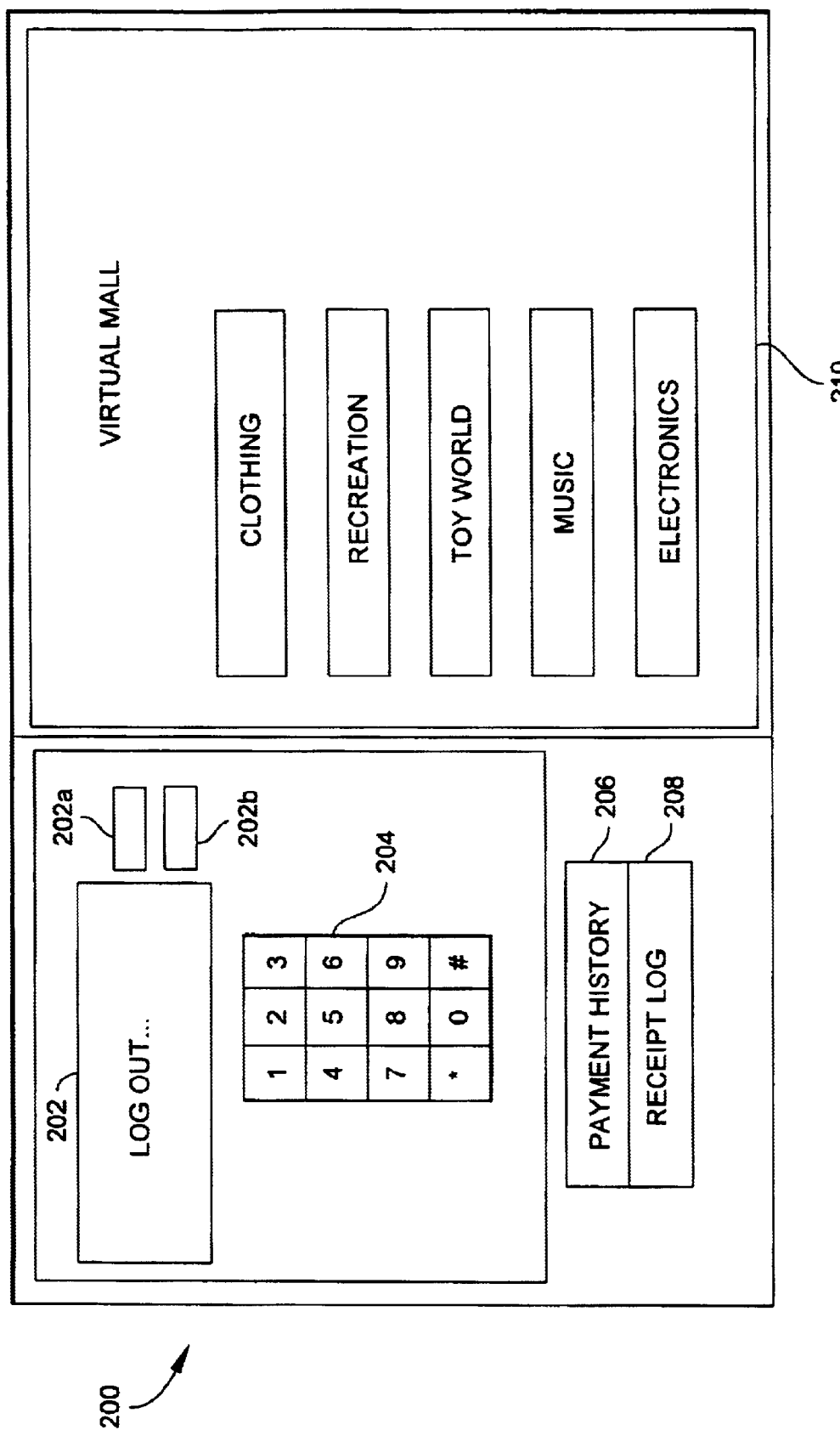

Referring to FIG. 11, display 210 displays a message indicating that the transaction with the GAP is complete. The consumer may "click" on Receipt Log icon 208 to receive a print-out of a receipt of the transaction. Once the consumer "clicks" on Receipt Log icon 208, a receipt is automatically downloaded and printed out on the consumer's printer. The receipt contains information concerning the transaction, such as date, time, vender, amount, item, etc. Referring to FIGS. 11 and 12, the consumer then "clicks" on box 202*b* to "log out". Once this is done, display 210 returns to its original format. At any time during or between transactions, a consumer can click on Payment History icon 206 to obtain a history of all transactions for a specific period of time.

Figure 13:
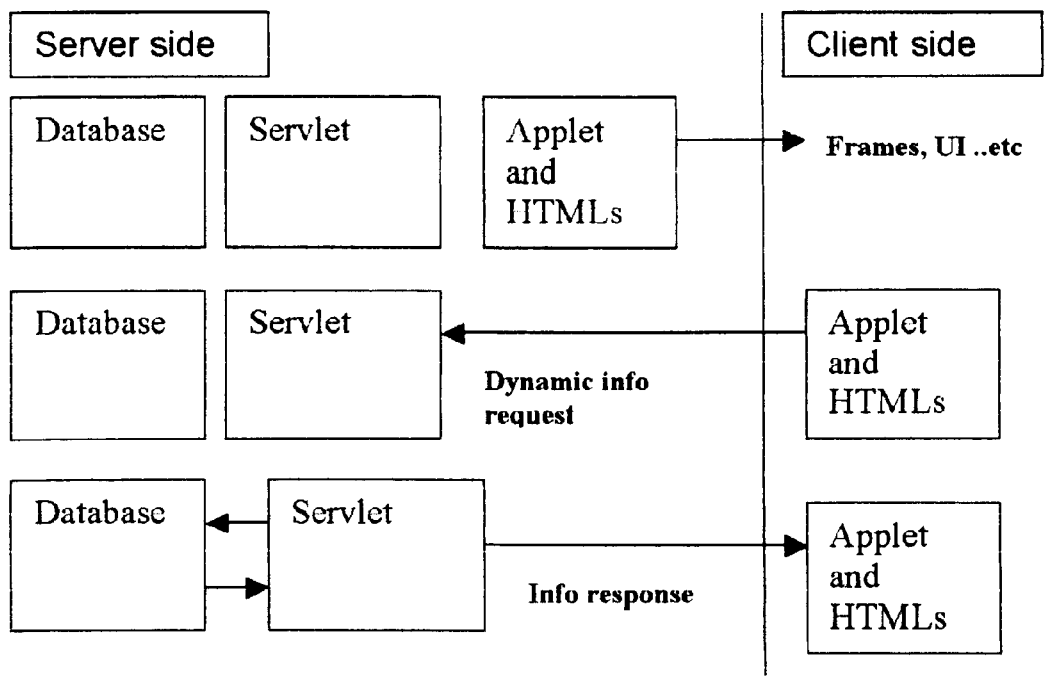
FIG. 13 is a block diagram illustrating a server side software architecture of the present invention used by the system of the present invention shown in FIG. 1.

Another important aspect of the present invention is server side software architecture. Referring to FIG. 13, there is shown a block diagram illustrating the aforementioned architecture. Unlike conventional server side software architectures, software is not downloaded to the client side for implementation on the client computer system (also known as "Applet" by Java Technology). Furthermore, the software does not comprise a program that runs at server side (also known as "Servlet" by Java Technology). Instead, the server side software architecture of the present invention comprises an integration of Applet and Servlet architectures to form what shall be referred to herein as the "Thin Servlet" architecture. The Thin Servlet architecture exhibits many of the advantages of both of the Applet and Servlet architectures.

As shown in FIG. 13, Thin Servlet comprises two components: (i) Applet that is downloaded, and (ii) Servlet that works with a particular Applet of the client's system. The Applet typically contains a common static field and pictures, such as window frame and user interface components. Relatively larger size components are put into Applet so that the user may experience longer duration of initialization time but relatively faster run time of the program.

In accordance with the present invention, the Applet is configured to have dynamic fields that are initially Null. When a user starts to execute the Applet, the Applet attempts to initiate a secure communication channel back to the server. A Servlet is created in real time to work with the particular Applet that requested the secure communication channel. As a result, a secure communication channel is established between the Servlet and Applet. The Applet uses the secure communications channel to request dynamic information from the server. The Servlet receives the Applet's request, extracts the information from the appropriate databases and outputs the requested data over the secure communications channel for reception by the Applet. Thus, the operating protocol of the Thin Servlet architecture of the present invention is as follows:

i) Display Back Message;
ii) Key Entry;
iii) To Local Security: Message To Transmit;
iv) To User Interface: Message Received;
v) Permission Request;
vi) Permission Response From User's Device For Security Policy Or Settings;
vii) Message To Transmit Is Approved By The User's Security Policy (message may be encrypted);
viii) Message Requires Reading Of Dynamic Data That Is Stored At User's Device (this message must be approved by "Local Security" prior to this event;
ix) Dynamic Data Read Request To User's Device;
x) Dynamic Data Response From User's Device;
xi) Decrypted Or Clear Information Is Displayed;
xii) To Communications Channel: Message Is Ready To Be Sent (encrypted by "security agent");
xiii) To Dynamic Content Security: All Received Messages Are Going To "Dynamic Content Security" Module In Order To Decrypt And Verify Other Security Attributes (i.e. authentication, integrity, etc.)
xiv) Communications Channel: Handles All Incoming And Outgoing Messages In Network Layer.

Thus, the method and system of the present invention provides the following advantages, benefits and features:

a) merchants realize a direct financial benefit because there are no transaction fees and there are relatively lower operational overhead costs;
b) all accounts are completely liquid;
c) merchants realize an effective and efficient marketing channel;
d) vendors do not have to deal with accounts receivable;
e) all transactions are actually a transfer of funds between account holders;
f) the e-cash can be used instantly on the Internet or public network;
g) consumers feel safe to do business on the Internet since no private information is needed to perform e-commerce transactions;
h) the virtual ATM provided by electronic bank and cash system 100 is easy to use;
i) if a transmission is intercepted, it will only contain a temporary account number formed in the "claim pool" which is realized by data storage device 156;
j) consumer's accounts can accrue interest or gain credit by promotional gift, rebate or legitimate advertisement;
k) funds can be transferred instantly among friends and family with no transaction costs;
l) consumers are protected from junk advertisement e-mail, SPAM, etc.; and
m) e-bank 100 can effect standard banking transactions as well as credit card clearance services;
n) e-bank 100 operates in a manner such that there is a single point of management, i.e. it provides anonymous financial transactions on the Internet but simultaneously records the trails of the transaction at e-bank 100.

The principals, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations in changes may be made by those skilled in the art without departing from the spirit of the invention. Accordingly, the foregoing detailed description should be considered exemplary in nature and not limited to the scope and spirit of the invention as set forth in the attached claims.

What is claimed is:

1. A method for effecting a financial transaction over a public network without the submission of sensitive information, comprising the steps of:

a) providing an apparatus comprising (i) a common controller in data communication with at least one public network, the common controller having user and transaction databases and a processor for generating digital tokens, each digital token representing a particular monetary value and containing a particular digital signature and alterable digital token status data indicating ownership of the digital token, and (ii) a plurality of user data communication interfaces in data communication with the public network;
b) establishing user accounts in the user databases of the common controller;
c) transmitting to the common controller a user identification and PIN to obtain access to the common controller;
d) authenticating the user identification and PIN to determine whether access to the common controller is permitted;
e) generating an application level secure communication channel through which all data communication is to be effected;

f) transmitting data representing a template of an automated teller machine to the user data communication interface of a first user whose identification and PIN were authenticated;

g) initiating a financial transaction between the first user and a second user by using the automated teller machine of step (f) to transmit a request to the common controller to effect a transfer of a monetary sum to a destination account;

h) generating a temporary account identified by an account number for temporarily storing the transferred monetary sum;

i) generating multiple digital tokens having a value equal to the monetary sum in the temporary account and data defining a unique digital signature and a digital token status;

j) transmitting to the first user encrypted data representing the temporary account number;

k) decrypting the data transmitted to the first user so as to change the status of the digital token to indicate the amount of e-cash that is subject of a pending transaction;

l) transmitting data to the common controller that authorizes the common controller to transfer the monetary sum from the temporary account to the destination account;

m) transmitting data to the second user representing the e-cash and the account number which identifies the temporary account having therein the monetary sum represented by the digital token; and n) transmitting data to the common controller to transfer the monetary sum corresponding to the value of the digital token from the temporary account to the destination account and to alter the status of the digital token to indicate ownership of the digital token and update the usage counter in each digital token.

2. The method according to claim 1 wherein step (c) further comprises the step of effecting server side certification.

3. The method according to claim 1 further comprising the step of closing the temporary account after the monetary funds are transferred to the destination account.

4. The method according to claim 1 wherein the apparatus further comprises at least one financial institution data communication interface that effects data communication between the common controller and a financial institution, the financial institution including a processor having databases that define user accounts.

5. The method according to claim 4 wherein the financial transaction between the first user and the second user comprises transferring a monetary sum from the first user's account in the financial institution to a corresponding first user's account in the processor of the common controller.

6. The method according to claim 4 wherein the financial transaction between the first user and the second user comprises transferring a monetary sum from the first user's account in the processor of the common controller to the corresponding first user's account in the financial institution.

7. The method according to claim 4 wherein the financial institution is a credit card company, the financial transaction between the first user and the second user comprises debiting an amount equal to the monetary sum from the first user's credit card.

8. The method according to claim 1 wherein at least some of the plurality of user data communication interfaces comprise:

an Internet service provider system; and a consumer data communication device in data communication with the Internet service provider system.

9. The method according to claim 1 wherein at least some of the plurality of user data communication interfaces comprise:

a wireless application protocol network; and a wireless consumer data communication device in data communication with the wireless application protocol network.

10. The method according to claim 9 wherein the wireless consumer data communication device is a cellular phone.

11. The method according to claim 9 wherein the wireless consumer data communication device is a personal digital assistant.

12. The method according to claim 1 wherein the apparatus further comprises a wireless application protocol network in data communication with the plurality of user data communication interfaces and the public network.

13. The method according to claim 1 wherein (i) the second user is a merchant, (ii) the processor of the common controller defines a claim pool account, and (iii) the destination account is the claim pool account, the method further including the step of transferring the e-cash from the claim pool account to the merchant's account in the processor of the common controller.

14. A method for effecting a financial transaction over a public network without the submission of sensitive information, comprising the steps of:

a) providing an apparatus comprising (i) a common controller in data communication with at least one public network, the common controller having user and transaction databases and a processor for generating digital tokens, each digital token representing a particular monetary value and containing a particular digital signature and alterable digital token status data indicating ownership of the digital token, and (ii) a plurality of user data communication interfaces in data communication with the public network;

b) establishing user accounts in the user databases of the common controller;

c) transmitting to the common controller a user identification and PIN to obtain access to the common controller;

d) authenticating the user identification and PIN to determine whether access to the common controller is permitted;

e) generating an application level secure communication channel through which all data communication is to be effected;

f) transmitting data representing a template of an automated teller machine to the user data communication interface of a first user whose identification and PIN were authenticated;

g) initiating a transaction between the first user and a second user to transfer a monetary sum to the second user by using the automated teller machine of step (f) to transmit a request to the common controller to effect transfer of the monetary sum from an account of the first user to an account of the second user;

h) generating a temporary account identified by an account number and transferring the monetary sum from the first user's account into the temporary account;

i) generating multiple digital tokens having a value equal to the monetary sum in the temporary account and data defining a unique digital signature and a digital token status;

j) transmitting to the first user encrypted data representing the temporary account number which handles a current transaction session;
k) decrypting the data transmitted to the first user so as to change the status of the digital token to indicate the amount of e-cash that is subject of a pending transaction;
l) transmitting data to the common controller that authorizes the common controller to transfer the monetary sum from the temporary account to the account of the second user;
m) transmitting data to the second user representing the e-cash and the account number which identifies the temporary account having therein the monetary sum represented by the digital token;
n) transmitting data to the common controller to transfer the monetary sum corresponding to the value of the digital token from the temporary account to the second user's account and to alter the status of the digital token to indicate ownership of the digital token and update the usage counter in each digital token; and
o) closing the temporary account.

15. The method according to claim 14 wherein at least some of the plurality of user data communication interfaces comprise:

a wireless application protocol network; and a wireless consumer data communication device in data communication with the wireless application protocol network.

16. The method according to claim 14 wherein step (c) further comprises the step of effecting server side certification.

* * * * *